H. HARBECKES.
PIPE CUTTER.
APPLICATION FILED OCT. 21, 1914.
1,217,305.  Patented Feb. 27, 1917.
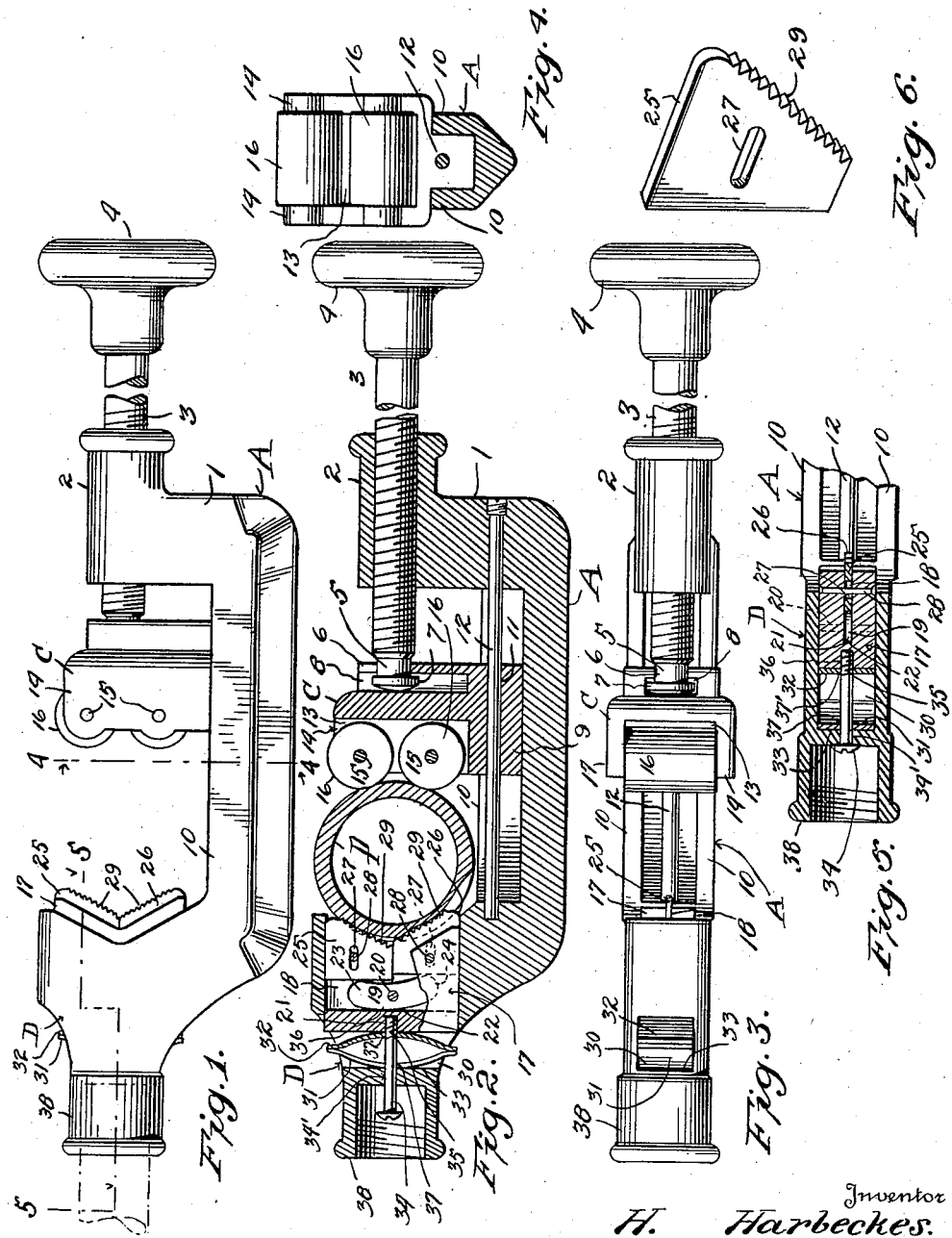

UNITED STATES PATENT OFFICE.

HENRY HARBECKES, OF PORTLAND, OREGON.

PIPE-CUTTER.

1,217,305.   Specification of Letters Patent.   Patented Feb. 27, 1917.

Application filed October 21, 1914. Serial No. 867,854.

*To all whom it may concern:*

Be it known that I, HENRY HARBECKES, a citizen of the United States, residing at Portland, in the county of Multnomah, State of Oregon, have invented certain new and useful Improvements in Pipe-Cutters; and I do hereby declare the following to be a full, clear, and exact description of the invention, such as will enable others skilled in the art to which it appertains to make and use the same.

This invention relates to certain novel and useful improvements in pipe cutters adapted especially for use in cutting iron bars and other pipe.

In carrying out my invention it is my purpose to provide a device of this character by means of which the pipe may be cut quickly, smoothly, evenly and neatly without leaving any bur either on the inside or outside of the pipe.

Still a further object of my invention is the provision of a pipe cutter having the cutting parts thereof so mounted and supported as to automatically adjust themselves to the pipe when the latter has been brought into contact with the blades, thereby insuring that the pipe will be accurately and properly cut.

Another object of my invention is the provision of a pipe cutter wherein when the cutter has been adjusted to the pipe the blades will be constantly maintained in cutting relation to the surface of the pipe without the necessity of frequently tightening the adjusting screw of the roller bearings, and thus considerable time is saved in the cutting operation.

It is also my purpose to provide a pipe cutter which will embody the desired features of simplicity, efficiency and convenience, and embodying as it does but relatively few parts, and these not liable to injury or derangement, may be manufactured and marketed at a relatively low cost.

With the above recited objects and others of a similar nature in view, my invention consists in the construction, combination and arrangement of parts set forth in and falling within the scope of the appended claims.

In the accompanying drawings:

Figure 1 is a view in side elevation of a pipe cutter embodying my invention.

Fig. 2 is a vertical longitudinal sectional view taken therethrough and showing the position of the cutting blades in making a cut in the pipe.

Fig. 3 is a top plan view of the pipe cutter.

Fig. 4 is a cross sectional view taken on the line 4—4 of Fig. 1 and looking in the direction of the arrow.

Fig. 5 is a horizontal sectional view taken on the line 5—5 of Fig. 1.

Fig. 6 is a detail perspective view of one of the cutting blades.

Referring now to the accompanying drawings in detail the letter A indicates the elongated metallic frame of the cutter, the shank 1 of which is provided with the usual threaded sleeve 2 in which works the feed screw 3, the outer end of said screw carrying the usual handle 4, while the inner end of the feed screw is preferably devoid of threads as shown at 5 and is adapted to be inserted in the vertical slots 6 in the carriage C so that the head 7 at the terminal of the unthreaded end portion 5 of the feed screw will lie within the groove 8 of the carriage. As the slot 6 is narrower than the groove 8, as shown in Fig. 2, it will be apparent that the feed screw at its inner end may be removably connected to the carriage C so that the carriage may move back and forth in the frame. The lower end of the carriage 9 rides between the horizontal, longitudinally extending parallel guide flanges 10 of the frame and is further formed with a longitudinal bore 11 for the passage of the longitudinally extending guide rod 12, which lies between the guide flanges 10 and is fastened at its ends in the frame. By this construction it will be seen that the carriage is positively guided in its longitudinal movement along the frame. The carriage is further formed with a recess 13 in the side walls 14—14 of which are mounted the shafts 15—15 carrying the bearing rollers 16—16, these rollers being adapted to bear against the surface of the pipe being cut in the well known manner, this pipe being indicated by the letter P. The end of the frame opposite the shank 1 is in the nature of a hollow head D, within which is located the cutter carrying the cutter holder or block 17, this block having a slot 18 extending therethrough. A segmental rocking lever 19 is located within this slot 18 and is mounted upon a transverse pivot 20, the outer edge 21 of the lever bearing against the end wall 22 of the slot 18, while the forward ends 23 and 24 of this lever are adapted to bear against the rear edges of the cutter blades 25 and 26 respectively. These cutter blades are duplicates or companions, one of the other, but are independently mounted in the cutter holder and operable in a parallel plane to each other and each blade having an elongated slot 27 therein through which passes a pin 28, these pins being mounted at their ends in the side walls of the slot of the holder. Each cutter blade is, of course, formed of steel or other suitable metal, and is provided with an inclined serrated cutting edge 29, the cutting edges of the blades when in cutting position, being disposed oppositely relative to each other so that they form an approximately V-shaped cutting jaw, as is clearly shown in Figs. 1 and 2. The numeral 30 designates an opening extending entirely through the head at the rear of the cutter holder, this opening 30 communicating with the hollow portion of the head in which the cutter holder is mounted. An elliptical spring formed of the bowed members 31 and 32 is located in this opening 30 of the head, the spring 32 being adapted to bear against the rear wall of the cutter holder, while the spring 31 bears against the end wall 33 of the head. A holding screw 34 extends through a bore 34' in the wall 33 of the head, and the end of the shank of this bolt is threaded as at 35 to screw into the threaded socket 36 in the rear wall of the cutter holder, the shank passing through openings 37 and 37' in the springs 31 and 32 respectively, thus maintaining the cutter holder and the springs in assembled position in the head of the frame. In connection with the mounting of the cutter blades 25 and 26 in the holder, I wish to particularly direct attention to the fact that these blades being independently mounted, and having a limited movement by reason of the pin and elongated slot connections, may move or shift slightly to adjust themselves properly to the pipe being cut. If the cutters were rigidly mounted, only one cutter would cut at a time, while with my arrangement of yieldingly mounting the cutters and tensioning the same by means of the elliptical spring, the cutters will operate simultaneously on the pipe.

When a small pipe is to be cut, one handle such as that shown at 4 is usually sufficient for operating the cutter, while if a relatively large heavy pipe is to be cut, it may be desirable to employ a second handle at the opposite or head end of the frame, and for this purpose I provide a threaded socket 38 into which a handle or bar may be inserted.

From the above description, taken in connection with the accompanying drawings, the construction and manner of employing my invention will be readily apparent to those skilled in the art. The pipe P is placed transversely of the cutter frame between the bearing rollers and the cutting blades and the feed screw is operated to shift or feed the carriage toward the pipe and bring the rollers into contact with such pipe. As the rollers strike the pipe, and the operation of turning the feed screw is continued, the rollers will force the pipe against the serrated or toothed edges of the cutting blades, and the rear edges of the blades in turn bear against the ends of the rocking lever 19, the lever rocking or shifting on its pivot sufficiently to enable the cutting edges of the blades to properly embrace the pipe, that is to say the blades will automatically adjust themselves to the surface of the pipe. As the pipe is forced against the cutters, the latter at their rear edges will in turn push against the rocking lever 19 and the latter will consequently press against the back wall 17 of the cutter holder and compress the elliptical spring members 31 and 32. If the cutters are forced downward a short distance, say about three-eighths of an inch, the pressure of the springs is then strong enough to hold the cutters in cutting relation with the pipe without the further turning or screwing of the feed screw, thereby saving time and labor in operating such feed screw. The springs 31 and 32 are further useful in that they save wear and tear on the cutter blades, for without the springs the operator might tighten the feed screw too tightly and force the pipe against the cutters to such an extent as to embed the teeth of the cutters too deeply in the pipe, thereby splitting or breaking such teeth.

While I have herein shown and described one particular embodiment of my invention, I wish it to be understood that I do not confine myself to all the precise details of construction herein set forth by way of illustration, as modification and variation may be made without departing from the spirit of the invention or exceeding the scope of the appended claims.

What I claim is:

1. In a pipe cutter, the combination with a cutter holder, of a pair of cutting blades mounted to follow one another in a cutting operation on the same side of the object to be cut, said blades being independently movable into the line of cut so that the following cutter blade may advance beyond the leading cutter blade and a common resiliently operative means for holding the cutter blades in their cutting positions.

2. In a pipe cutter, the combination with a cutter holder, of upper and lower cutting blades mounted in the holder and having independent longitudinal movements, and means bearing upon the backs of the cutting blades with a yielding pressure, whereby the following blade may advance into the cut beyond the lead of the leading blade.

3. In a pipe cutter of the class described, the combination with a cutter holder, of a pair of flat cutting blades loosely mounted in the holder and operable in a common plane, and means for simultaneously presenting one of said blades to make the cut and the other to make a deeper cut.

4. In a device of the class described, a frame including a shank portion and a head portion, a feeding member movable in the shank portion of the frame, a carriage connected with the feeding member and sliding on the frame, a bearing element on the carriage adapted to bear against the pipe to be cut, and a plurality of cutting blades mounted in a common plane and having independent longitudinal movements in the head of the frame, said blades being adapted to be brought into cutting relation with the same side of the pipe by the pressure of the bearing element against the opposite side of the pipe.

5. In a pipe cutter, a frame including a shank portion and a head portion, a feed screw mounted in the shank portion of the frame, a carriage adapted to be shifted along said frame by the feed screw, a pair of relatively flat contiguous cutters loosely and independently mounted in the head of the frame and shiftable bodily relative to each other and to the frame, said cutter formed with slots, pins arranged in the head of the frame and disposed in said slots, a rocking lever bearing at its ends against the adjacent edges of the cutters, and a tension device normally tending to thrust the cutters forward into contact with the pipe to be cut.

6. The combination with a pipe cutter, including the feed screw and a reciprocating carriage and bearing rollers carried thereby, of a head for said cutter, a cutter-holder yieldingly mounted in the head, a pair of cutting blades independently mounted in the holder and capable of a limited shifting movement relative to the holder, a rocking lever in the holder adapted to bear against the cutters, and a spring carried by the head and contacting with the holder and normally exerting pressure on the latter to force the cutters toward the pipe to be cut.

7. The combination with a frame including a shank and a head, and a section connecting the shank and the head, said section having guide-flanges, a guide-rod extending longitudinally of said section between the flanges, a carriage sliding on the guide rod, a feed screw threaded in the shank of the frame and detachably connected with the carriage, bearing rollers carried by said carriage and adapted in the forward movement of the carriage to bear against a pipe to be cut, a cutter-holder yieldingly mounted in the head of the frame, a pair of cutting blades mounted in a slot in the holder and capable of a limited shifting movement relative to the holder, a rocking lever pivotally mounted in the holder between the rear wall of the slot and the cutter blades, and a spring mounted in the head behind the holder and adapted to bear against the holder to normally force the latter with its cutters forward toward the pipe to be cut.

8. In a pipe cutter, a frame including a shank portion and a head portion, a feed screw mounted in the shank portion of the frame, a carriage adapted to be shifted along said frame by said feed screw, a pair of cutting blades independently mounted in the head of the frame and operable in a common plane, said cutting blades formed with elongated slots, pins arranged in the head of said frame and adapted for passage through said cutter slots for guiding the movement of the said cutters, a rocking lever bearing at its ends against the adjacent edges of the cutters, and a spring disposed in said head and normally tensioning the said cutters forward into contact with the pipe to be cut.

In testimony whereof, I affix my signature, in the presence of two witnesses.

HENRY HARBECKES.

Witnesses:
HARTLEY H. CROWDIS,
R. A. BENSELL.

Copies of this patent may be obtained for five cents each, by addressing the "Commissioner of Patents, Washington, D. C."